United States Patent [19]

Bobeck et al.

[11] 3,837,911

[45] Sept. 24, 1974

[54] MAGNETIC DEVICES UTILIZING GARNET EPITAXIAL MATERIALS AND METHOD OF PRODUCTION

[75] Inventors: Andrew Henry Bobeck, Chatham, Morris County; Hyman Joseph Levinstein, Berkeley Heights, Union County; Larry Keith Shick, Bridgewater Township, Somerset County, all of N.J.

[73] Assignee: Bell Telephone Laboratories, Incorporated, Murray Hill, Berkeley Heights, N.J.

[22] Filed: Oct. 29, 1971

[21] Appl. No.: 193,976

Related U.S. Application Data

[63] Continuation-in-part of Ser. No. 133,361, Apr. 12, 1971, which is a continuation-in-part of Ser. No. 89,632, Nov. 16, 1970 abandoned.

[52] U.S. Cl. ............. 117/235, 117/104 R, 117/113, 117/119.2

[51] Int. Cl. ............................................ H01f 10/02

[58] Field of Search ............................ 117/235–240, 117/104 R, 113, 119.2

[56] References Cited

UNITED STATES PATENTS

| | | | |
|---|---|---|---|
| 3,421,933 | 1/1969 | Pulliam | 117/121 |
| 3,429,740 | 2/1969 | Mee | 117/106 |
| 3,486,937 | 12/1969 | Linares | 117/236 |
| 3,607,390 | 9/1971 | Comstock | 117/237 |
| 3,645,788 | 2/1972 | Mee et al. | 117/240 X |
| 3,647,538 | 3/1972 | Wolfe | 117/234 |

OTHER PUBLICATIONS

Linares, Journal Crystal Growth, p. 443, 1968.

*Primary Examiner*—Murray Katz
*Assistant Examiner*—Bernard D. Pianalto
*Attorney, Agent, or Firm*—G. S. Indig

[57] ABSTRACT

Magnetic garnet compositions grown by liquid phase epitaxy have appropriate magnetic properties for use in bubble domain devices - a class of magnetic devices in which information is represented by enclosed domain regions of polarity opposite to that of immediately surrounding material. Critical selection of compositions, all containing mixed rare earth cations, as well as careful choice of processing conditions yield films which are both uniform in composition and dimension, as well as lacking in hillock formation and other surface irregularities.

17 Claims, 4 Drawing Figures

INVENTORS A.H. BOBECK
H.J. LEVINSTEIN
L.K. SHICK
BY George S. Indig
ATTORNEY

MAGNETIC DEVICES UTILIZING GARNET EPITAXIAL MATERIALS AND METHOD OF PRODUCTION

RELATIONSHIP TO OTHER APPLICATIONS

This application is a continuation-in-part of application Ser. No. 133,361, filed Apr. 12, 1971 now abandoned which was a continuation-in-part of application Ser. No. 89,632, filed Nov. 16, 1970 now abandoned.

BACKGROUND OF THE INVENTION

1. Field of the Invention

The invention is concerned with magnetic "bubble" devices. Such devices, which depend for their operation on the nucleation and/or propagation of small enclosed magnetic domains of polarization opposite to that of the immediately surrounding material, may perform a variety of functions including switching, memory logic, etc.

2. Description of the Prior Art

The last two years has seen significant interest develop in a class of magnetic devices known generically as "bubble" domain devices. Such devices described, for example, in *IEEE Transactions*, Mag-5 (1969), pp. 544–553 are generally planar in configuration and are constructed of materials which have magnetically easy directions essentially perpendicular to the plane of the structure. Magnetic properties, e.g., magnetization, anisotropy, coercivity, mobility, are such that the device may be maintained magnetically saturated with magnetization in a direction out of the plane and that small localized regions of polarization aligned opposite to general polarization direction may be supported. Such localized regions, which are generally cylindrical in configuration, represent memory bits. Interest in devices of this nature is, in large part, based on high bit density. Such densities, which are expected to reach $10^5$ bits or more per square inch of wafer, are, in turn, dependent on the ability of the material to support such localized regions of sufficiently small dimension.

In a particular design directed, for example, to a $10^6$ bit memory, bubble domains of the order of 1/3 mil in diameter are contemplated. A $10^5$ bit memory may be based on stable domains three times greater, and a $10^7$ bit memory requires stable bubble domains three times smaller.

To date, one of the more significant obstacles to commercial realization of such devices has been the material limitation. The first problem has been a practical one, i.e., growth of sufficiently large crystals which are sufficiently defect-free, show physical and chemical stability, etc. An equally significant problem is more fundamental. Materials of requisite uniaxial anisotropy have generally been lacking in some aspect.

A significant breakthrough in the materials problem involves materials of the garnet structure, see *Applied Physics Letters*, pp. 131–134 (Aug. 1, 1970). It was discovered that magnetic garnets based on the prototypical composition, $Y_3Fe_5O_{12}$ (YIG), when properly substituted and properly grown, evidenced a unique magnetic easy direction and otherwise were possessed of appropriate magnetic properties for bubble devices incorporation. This represented a significant departure from the generally assumed properties of garnet materials which were previously believed to be magnetically isotrophic.

Within a very short period of the discovery of anisotropic garnet materials, devices utilizing stable bubbles of a mil and less in diameter were in operation. These devices utilized thin slices of flux grown crystals. In a particular class of materials, such slices were approximately parallel to free (211) facets in which the easy direction was the [111] about 20 degrees off-normal with respect to the facet. Some of the best devices constructed to date have utilized such materials. The excellent properties of slices prepared from bulk crystals prevent this procedure from being discounted for commercial use.

Some time thereafter, work was described in which growth-induced unique anisotropy in a [100] direction was observed, see *Journal of Applied Physics*, Vol. 42 March 1971. Slices of such material were taken from crystalline segments lying under (110) facets. Materials evidencing such unique anisotropy known as "Type III" cuts are found to include a large number of compositions, many of which also evidence [111] unique anisotropy under a (211) facet in the same bulk grown crystal. [111] easy direction is generally considered preferred for devices of the type concerned. Single wall domains produced in this direction tend to be circular rather than elliptical due to the fact that equivalent crystallographic <111> directions are symmetrically disposed about the easy [111] direction. The major effect of the anisotropy in the (100) plane normal to the [100] direction introduces an ellipticity which, depending on its magnitude, may have a somewhat disadvantageous effect on packing density as well as on device operating parameters.

It has been clear for some time, however, that a more direct approach to the preparation of the very thin layers of magnetic material required would be of interest. Accordingly, there has been some considerable effort directed to the growth of epitaxial material. Reported work has been largely directed to layers produced from the vapor by thermal decomposition. This procedure appears promising, and it is possible that device grade material will eventually be prepared. At this time, however, reported materials prepared by this technique have been closely related to YIG and have not had appropriate magnetization or other properties desired for bubble devices. Additionally, magnetic anisotropy in such films has generally been stress-induced rather than growth-induced. While materials having stress-induced anisotropy may meet device requirements, fabrication procedures are complicated.

Alternative techniques for epitaxial growth of garnet compositions are known. One of these, liquid phase epitaxy (LPE), is quite attractive. This procedure may utilize growth from flux compositions closely related to those already in use in the growth of bulk materials and may therefore benefit from a well-developed technology. Temperature may be kept to a reasonably low level so as to minimize complicating effects of interfacial gradients (or, alternatively, conditions may be controlled so as to prepare desirable interfacial compositions). LPE is a well-developed procedure for the growth of certain materials. For example, it has been broadly used in the growth of certain III-V semiconductors such as GaP in the preparation of electroluminescent diodes, see *Materials Science and Engineering*, pp. 69–109 (1970).

Garnet materials have been grown by LPE, see, for example, *Journal of Crystal Growth* 3,4 (1968) pp.

443–446. Reported films have, however, been lacking for device use of a type here contemplated in that: 1) film compositions have been magnetically inappropriate, 2) saturable uniform easy direction normal to the film surface has not resulted, and 3) films otherwise of greatest interest have evidenced hillock formation and other irregularities precluding device fabrication.

SUMMARY OF THE INVENTION

In accordance with the invention, magnetic garnet films appropriate for use in magnetic devices, such as bubble devices, are grown by liquid phase epitaxy. Such films evidence a magnetic easy direction which is normal to the film plane, as well as magnetization, coercivity, and other magnetic properties appropriate for device incorporation. Such films do not evidence hillocks or other surface irregularities previously associated with LPE garnet films.

Development of satisfactory materials is dependent upon critical choice both of composition and of processing conditions. Compositions invariably containing at least two cations, usually two rare earth ions, in the dodecahedral site are responsible for the requisite anisotropy and may favorably influence other magnetic properties. Proper selection of processing conditions is primarily responsible for the growth of smooth films, of course, of dimensional and compositional integrity.

Epitaxial films prepared in accordance with the invention may evidence a unique easy direction normal to the film plane with such anisotropy being primarily growth induced. While a minor part of the easy direction may be due to strain, this part is of sufficiently small magnitude (usually less than 10 percent of the total unique anisotropy) as to avoid significant processing difficulty. Films are grown on (111) or (100) plates of garnet materials having lattice parameters closely matched to those of the film at room temperature. An interesting aspect of the invention is that the smooth (111) and (100) films of grown epitaxial material do not correspond with any naturally occurring free facets ever observed on a bulk grown garnet crystal. Accordingly, while a preferred species of the invention concurs primarily growth-induced unique easy direction, growth of materials manifesting primarily strain-induced properties is also contemplated providing such growth takes the form of (111) or (100) films or of films otherwise representing such "artificial facet" growth.

In one respect, at least, films prepared in accordance with this invention are advantageous even as compared to slices prepared from bulk grown crystals. Since, for example, (111) slices are taken from crystal segments bounded by the (211) free facets and since the easy direction is substantially a <111> direction, a truly normal easy direction may result only in a slice which is neither parallel nor perpendicular to the facet (for example, at an angle of about 20° to the facet). The same advantage obtains for (100) films grown by the inventive process. Since facets of this orientation, like (111) facets, are thermodynamically unstable, slices of this orientation may only be taken off-angle relative to bulk crystal growth directions (in fact, useful (100) slices are defined in the bulk crystal as projecting into the body on a plane, the edge of which is defined by the intercept corresponding with a short dimension of the diamond-shaped free (110) facet). The compositional gradient, due to growth, is, in consequence, even more disadvantageous than for (111) "Type II" slices which are only 20° off axis. Bulk slices necessarily include material grown at different times. Any compositional gradient associated with distribution coefficients unequal to one, therefore, are in evidence from one edge of the slice to the other. The result is usually at least a minor variation in some magnetic property. Since the entire film of the LPE layer is grown simultaneously, such gradients may be avoided.

Appended claims are directed to devices incorporating LPE films of the invention as well as to the procedures involved in the preparation of the films.

DETAILED DESCRIPTION

1. Compositional Considerations

*a*. The Film

Figure 1:
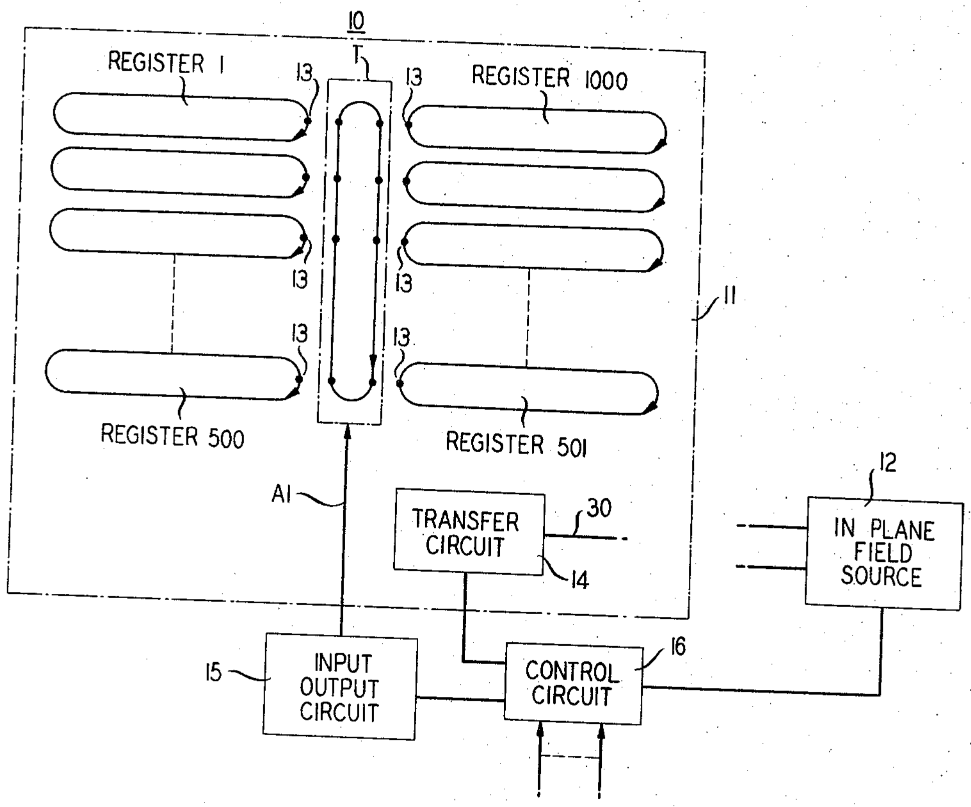
FIG. 1 is a schematic diagram of a recirculating memory utilizing an LPE grown garnet layer in accordance with the invention.

Garnets suitable for the practice of the invention are of the general nominal stoichiometry of the prototypical compound $Y_3Fe_5O_{12}$. This is the classical yttrium iron garnet (YIG) which, in its unaltered form, is ferrimagnetic with net moment being due to the predominance of three iron ions per formula unit in the tetrahedral sites (the remaining two iron ions are in octahedral sites). In this prototypical compound, yttrium occupies the dodecahedral sites and the primary compositional requirement, in accordance with the invention, is concerned with the nature of the ions in part or in whole replacing yttrium in the dodecahedral sites.

A usual requirement for assurance of a LPE film manifesting essentially homogeneous uniaxial anisotropy substantially normal to the surface and/or other desired device properties is that the dodecahedral sites be occupied by at least two different ions. For the purpose of this invention, each of these ions referred to as A ions and B ions must be present in amount of at least 10 atom percent based on the total number of ions occupying dodecahedral sites. Ions which may occupy such sites in amounts of at least 10 percent include $Y^{3+}$, $Lu^{3+}$, $La^{3+}$ and the trivalent ions of any of the 4F rare earths as well as ions of other valence states such as $Ca^{2+}$. Such ions are sometimes introduced for charge compensation, for example, where ions of valence state other than $3^+$ are substituted in part for iron. Compositions containing all such ions have been studied extensively and are reported, see, for example, *Handbook of Microwave Ferrite Materials*, Ed. by Wilhelm H. Von Aulock, Academic Press, New York (1965).

A further requirement pertains to the size and nature of the magnetostrictive contribution of the A and B ions in the <111> crystal directions. The simplest case for growth-induced easy direction concerns A and B ions that induce opposite magnetostrictive signs in this sense.

The following table is a computation of data presented in vol. 22, *Journal of the Physical Society of Ja-*

*pan*, P. 1201 (1967). This table presents the magnetostrictive values in dimensionsless units representing centimeters change per centimeter of length for $R_3Fe_5O_{12}$ garnet compositions. The trivalent A or B ions are ranked in order of decreasing size.

TABLE 1

| (A,B) ion | $\lambda_{<111>}$ | $\lambda_{<100>}$ |
|---|---|---|
| Sm | $-8.5 \times 10^{-6}$ | $+21 \times 10^{-6}$ |
| Eu | $+1.8 \times 10^{-6}$ | $+21 \times 10^{-6}$ |
| Gd | $-3.1 \times 10^{-6}$ | zero |
| Tb | $+12.0 \times 10^{-6}$ | $-3.3 \times 10^{-6}$ |
| Dy | $-5.9 \times 10^{-6}$ | $-12.5 \times 10^{-6}$ |
| Ho | $-4.0 \times 10{-6}$ | $-3.4 \times 10^{-6}$ |
| Y | $-2.4 \times 10^{-6}$ | $-1.4 \times 10^{-6}$ |
| Er | $-4.9 \times 10^{-6}$ | $+2.0 \times 10^{-6}$ |
| Tm | $-5.2 \times 10^{-6}$ | $+1.4 \times 10^{-6}$ |
| Yb | $-4.5 \times 10^{-6}$ | $+1.4 \times 10^{-6}$ |
| Lu | $-2.4 \times 10^{-6}$ | $-1.4 \times 10^{-6}$ |

A requirement of a preferred embodiment is that the composition be of such nature as to yield its easy magnetic direction in the [111] direction normal to the film (since this condition results in cylindrical domains). Films prepared in accordance with the procedures herein which show primarily growth-induced easy direction, when annealed at sufficiently high temperature (about 1200° C for times depending upon atmospheric condition), lose a substantial portion of their magnetic easy direction and become essentially magnetically isotropic. For the purposes of this invention, materials retaining less than 25 percent of their <111> unique anisotropy after annealing are considered to manifest primarily growth-induced properties. (Such annealing, of course, removes stress-induced anisotropy but this type of anisotropy is regenerated on cooling.) The corressponding <111> stress-induced anisotropy is desirable from a manufacturing standpoint in that it avoids modification in device properties resulting during fabrication and handling. Nevertheless some of the films reported herein manifest anisotropic properties which are primarily strain-induced and such films while causing possible manufacturing complications, are usefully employed in devices of the type contemplated.

The larger grouping of compositions meeting the inventive requirements have been previously described as Type I or Type II materials. These materials are known to evidence their magnetic easy direction in the [111] crystallographic direction nearly in or normal to the free (211) facet of a growing bulk crystal. Such materials result for example, where one of the two ions has a negative magnetostrictive sign, while the other has a positive sign. This grouping is, however, not exclusive. Also instances occur in which the anisotropy of the growing bulk crystal is not determinative of the anisotropy of the LPE layer. A specific example of such a composition described in an example herein is $Er_2Eu_1Fe_{4.3}Ga_{0.7}O_{12}$. This and other such materials owe their uniaxial directive properties to the influence of the substrate. In certain cases, it is believed that the easy direction normal to the film is due to modification of the film composition by introduction of substrate ions by diffusion, for example, gadolinium, from a particular substrate used in some of the work reported herein. In others the effect is wholly or partly due to strain.

As indicated, the bulk of the description is in terms of (111) domains since these are generally preferred from a device standpoint. It has, however, been indicated that invention, at least in part, derives from the fact that the (111) is an "artificial" facet, that is, a facet which does not grow as a free facet on a bulk crystal. The free energy of the (111) surfaces is relatively high and they therefore grow faster and so cap earlier in the crystallizing process. (111) facets may be described as being nonequilibrium facets. As such, they are illustrative of a class of nonequilibrium facets including, for example, (100). In a broad sense, therefore, the invention in part arises from the ability to grow smooth nonequilibrim facets which are not available in bulk grown crystals. While from the device standpoint the (111) films are certainly to be preferred, other nonequilibrium facet growth including (100) is made possible by the inventive teaching.

EXAMPLES

Examples of film compositions meeting the inventive requirements are set forth:

$Gd_{2.34}Tb_{.66}Fe_5O_{12}$
$Gd_{2.325}Tb_{.585}Eu_{.09}Fe_5O_{12}$
$Er_2Eu_1Ga_{.7}Fe_{4.3}O_{12}$
$Gd_{2.10}Tb_{.9}Fe_5O_{12}$
$Gd_{2.79}Tb_{.21}Fe_5O_{12}$
$Gd_{2.70}Nd_{.30}Fe_5O_{12}$
$Y_{1.00}Gd_{2.00}Al_{.33}Fe_{4.67}O_{12}$
$Y_{1.03}Gd_{1.29}Yb_{0.68}Al_{0.7}Fe_{4.3}O_{12}$
$Y_{1.75}Gd_{1.0}Eu_{0.25}Al_{0.6}Fe_{4.4}O_{12}$

As noted above, Type I and II materials (i.e., those evidencing their easy magnetic direction in the [111] easy direction most nearly in or normal to the (211) free facet of a bulk grown crystal respectively) result when particular pairs of ions occupy the dodecahedral site. Such Type I and II materials are inter alia, suitable for the inventive purposes.

As indicated, the examples noted are illustrative of the preferred embodiment resulting in (111) films. It has been indicated, however, that device property "Type III" materials may be grown in accordance with the inventive methods to result in (100) films. An example of film compositions of this type is $$Eu_{1.9}Gd_{1.1}Al_{0.5}Fe_{4.5}O_{12}.$$

In addition all materials listed as growing epitaxially to produce smooth (111) facets are observed to grow in similar fashion on (100) substrates to produce smooth (100) facets. While all such materials may not yield the desired easy direction of magnetization for bubble devices, the generality of the inventive teaching is clearly indicated.

*b.* The Substrate

Substrate requirements are apparent. Basically, device properties are to be attributed to the film itself and, ideally, device properties should in no way be affected by the substrate.

Epitaxial growth, of course, requires a reasonable match in lattice dimensions regardless of whether unique easy direction is primarily growth or strain induced. From this standpoint, it has been found adequate to match lattices within about 0.5 percent ($a_o$, generally of the order of 12 angstroms). In general, it has been found adequate to match film to substrate at the device operating temperature. While there is some probable advantage to also matching the temperature coefficient of expansion so that the match would extend over the entire range of temperature encountered during fabrication, many of the devices reported herein show no such match in coefficient and operating characteristics are acceptable for device use.

Devices of concern depend on magnetic properties of the film, and the magnetic contribution of the substrate should be minimal. Ideally, for most devices, it would be preferred to have a substrate which is nonmagnetic. In order to get preferred matching, however, use has often been made of substrate materials which are strongly paramagnetic, again, with little noticeable effect on device operating characteristics. While a weakly ferrimagnetic material or ferromagnetic material could be used as a substrate, it is preferable that only the film be magnetically saturable at the operating temperature.

From the standpoint of film perfection, the substrate should be of the appropriate orientation; that is, (111) or (100), that it evidence a fair degree of crystalline perfection (in particular that it be essentially free of low angle grain boundaries), and that it be smooth and flat (preferably that it be optically flat). Since many device uses contemplated require optical readout, or sometimes even the use of light for recording information, the substrate should evidence the required transmission characteristics. Accordingly, since optical readout generally depends on rotation of plane polarized light, the substrate should be substantially nonbirefringent.

The substrate should generally have a resistivity of the order of $10^2$ ohm cm. or better to avoid eddy current losses.

The appropriate lattice parameter matching is most easily achieved by use of garnet substrates. While many substrate compositions are useful, it is possible to match substantially all film compositions of interest by use of but one or a combination of two basic substrate compositions. The first of these, $Nd_3Ga_5O_{12}$, has a lattice parameter $a_o$ equal to 12.52 angstroms. The second, $Gd_3Ga_5O_{12}$, has a lattice parameter $a_o$ equal to 12.38 angstroms. Either of these nominal compositions may be varied by slight departure from stoichiometry to produce concomitant change in $a_o$. Intermediate values may be obtained by mixtures of these two fundamental compositions as may be represented by the formula $Nd_xGd_{3-x}Ga_5O_{12}$. Intermediate values of $a_o$ are approximately linearly related to composition. All lattice parameter values set forth are those which have been reported at room temperature; it being the general requirement that film and substrate be matched at the operating temperature which is generally room temperature. It may be desirable to choose the two materials such as to result in substantial matching at operating temperature at other than room temperature. Where dependence is hard on strain-induced effects substrates having smaller or larger values of $2_o$ may be chosen. Values of from 12.30 to 12.56 are obtainable for example, by use of the end numbers, $Dy_3Ga_5O_{12}$ and $Gd_3(Sc\ Ga)_5O_{12}$, respectively.

The substrate composition examples set forth have been used in some of the material reported herein but are to be considered exemplary only. Other nonsaturable substrate materials may utilize other nonmagnetic ions in lieu of gallium. Examples are scandium and aluminum. Under most circumstances, occupancy of the dodecahedral site in the substrate composition is noncritical from an operational standpoint. Lattice matching may be achieved or optimized by partial or total substitution for Nd and/or Gd by any of the 4*f* rare earths or other ions known to form garnet structure. See examples herein.

It has been noted that the substrate may have a significant effect on the operational characteristics of the epitaxial layer. For example, it is postulated in certain instances that nominal compositions are modified by gadolinium or other ingredients which migrates from the substrate to the film during growth. Accordingly, all compositions set forth both in this section and elsewhere are nominal and refer only to the material introduced during the relevant procedural step. Final film and substrate compositions are expected to show some variation, particularly in the interfacial region.

It is generally assumed that substrate and film compositions are independent and that the interface represents a quantum step in composition. In actuality, there is inevitably a compositional gradient in the interfacial region, the severity of which depends on processing conditions. A general requirement is that the interfacial region not manifest a magnetization greater than that of the film surface, although device modifications have been suggested which may utilize even such an interfacial layer.

*c*. The Flux

Many flux systems have been used in the growth of bulk garnet crystals and all such systems are usable for the inventive purposes. Basically, the most popular systems contain either lead oxide, PbO, or bismuth oxide, $Bi_2O_3$. Of these, by far the most prevalent contain lead oxide, and such fluxes are frequently modified by additional ingredients such as lead fluoride, $PbF_2$, and/or boron oxide, $B_2O_3$, in order to control solubility, number of nucleation sites, crystallization rate, and temperature range over which crystallization may be carried out.

A significant aspect of the invention is based on the growth of an "artificial facet," i.e., a smooth (111) or (100) facet never observed in bulk crystal growth. Prior attempts to grow material of this orientation have generally resulted in hillocks, facets, or other surface irregularities. While growth of such material is in all probability due, in part, to the compositional nature of the film, it is due, in part, also, to growth parameters which are, in turn, related to the flux system chosen. This consideration, discussed in some detail under "Processing," is largely concerned with two considerations. The first of these is related to substrate attack and this, in turn, is related to the amount of volatile material in the flux under the operating conditions. The second has to do with growth of the film, and this is believed to be related to the number of nucleation sites.

In general, substrate attack is minimized by use either of less volatile flux ingredients or of lower crystallizing temperature. In general, $Bi_2O_3$ systems are less volatile and so crystallization may proceed at relatively high temperature without significant substrate attack. Faceting during growth is minimized generally by rapid growth due to effectively high cooling rates, and the major requirement imposed on the flux by this consideration is merely a reasonable temperature range of crystallization.

There is a particular advantage associated with the use of a PbO-containing flux for "immersion" growth herein. It is the nature of fluxes of this type, as described, that they readily drain from the emerging substrate and film. $Bi_2O_3$ fluxes, which are otherwise equivalent from many standpoints, have a sufficiently low wetting angle to adhere on emergence so that growth may continue after the substrate has left the liquid. While this is necessary in the "wetted" procedure herein, it is unnecessary in the "immersion" procedure. Use of the "nonwetting" PbO-containing flux for immersion growth results in a degree of film thickness uniformity not oridinarily attained with wetted growth (where the effect of gravity is to result in a larger nutrient reservoir on the lower extremity of the wafer).

*d.* Miscellaneous Requirements

The foregoing is sufficient to assure validity of the inventive assumption in the general case. It has, however, been stated that a firm mechanistic basic for the basic phenomenon of growth induced uniaxial magnetic anisotropy in the supposedly "cubic" garnet is not presently available (a satisfactory model is available for strain-induced effects). While such unique growth-induced magnetization direction invariably results in appropriate compositions where growth proceeds under appropriate conditions, such materials are rendered isotropic by high temperature anneal. It has been observed, for example, that growth-induced anisotropy is removed by annealing at temperatures of the order of 1200° C. or greater for periods of several hours. It follows that the techniques utilized for producing grow-induced effects should not result in such annealing. For practical reasons, growth temperatures are generally below 1200° C. even where anisotropy is strain induced (substrate attack is one problem).

As described in *IEEE Transactions* MAG-5 (1969) pp. 544–553, bubble diameter varies with magnetic moment as $M^{-2}$. This implies a range of magnetization appropriate to sustain bubble domains of a desired size. For usual devices, this, in turn, gives rise to a desired magnetization range of from about 30 gauss to about 500 gauss. Since most garnet compositions in which both tetrahedral and octahedral sites are occupied by iron ions have magnetizations which are in excess of this range, it is often desirable to partially replace some iron. In general, this is accomplished by partial substitution with nonmagnetic ions preferentially occupying tetrahedral sites (the net moment in the prototypical composition is due to the preponderance of iron in these sites). Examples of such ions are $Ga^{3+}$, $Al^{3+}$, $Si^{4+}$, $Ge^{4+}$ and $V^{5+}$. For such preferential occupancy, ionic radii should be equal to or less than 0.62 angstrom units.

Such considerations, relative to magnetization, are illustrative only and other modifications may be made to result in moments of the desired magnitude over the intended operating temperature.

While dependence may be had on local stress, it is often desirable that the garnet composition manifest a low value of magnetostriction in the <111> direction. This desideratum, attainable in growth-induced materials, has obvious fabrication advantages in that materials may be bonded to substrates of different expansivity without adverse effect on coercivity which, in turn, impedes bubble propagation. It also permits a broader latitude of processing techniques. Net finite <100> magnetostriction also impairs domain wall bubble mobility regardless of whether the easy direction is <100> or <111>. Appropriate selection of ions in the three cation sites may result in all such desiderata.

Another parameter of practical significance is concerned with the temperature dependence of the foregoing characteristics. It has been determined experimentally that such insensitivity may be measured in terms of variation of magnetization alone (low temperature dependence of magnetization assuring sufficient insensitivity of other relevant parameters such as crystalline anisotropy, etc.). While simple two-cation garnet compositions frequently show good temperature properties, compositions modified to reduce moment ordinarily do not. Fortunately, it is possible to so select the dodecahedral cations as to minimize the temperature dependence introduced by dilution in the tetrahedral sites.

2. The Figures

Figure 2:
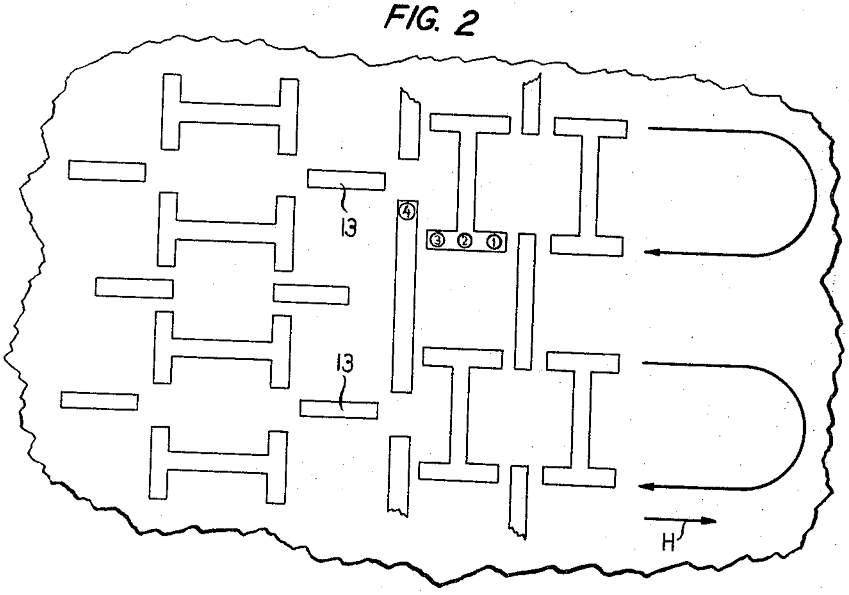
FIG. 2 is a detailed magnetic overlay and wiring configuration for portions of the memory of FIG. 1 showing domain locations during operation.

The device of FIGS. 1 and 2 is illustrative of the class of "bubble" devices described in *IEEE Transactions on Magnetics*, Vol. Mag-5 No. 3, September 1969, pp. 544–553 in which switching, memory and logic functions depend upon the nucleation and propagation of enclosed, generally cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of development of the bubble devices and include some details which have been utilized in recently operated devices.

FIG. 1 shows an arrangement 10 including a sheet or slice 11 of material in which single wall domains can be moved. The movement of domains in accordance with this invention is dictated by patterns of magnetically soft overlay material in response to reorienting in-plane fields. For purposes of description, the overlays are bar and T-shaped segments and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization in accordance with this invention unencumbered by the details of the implementation. We will return to an explanation of the implementation hereinafter.

The figure shows a number of horizontal closed loops separated into right and left banks by a vertical closed loop as viewed. It is helpful to visualize information, i.e., domain patterns, circulating clockwise in each loop as an in-plane field rotates clockwise.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated, that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions (13) where a transfer operation moves the pattern from the vertical channel back into appropriate horizontal channels as described above. Once again, the information movement is always synchronized by the rotating field so that when transfer is carried out, appropriate vacancies are available in the horizontal channels at positions 13 of FIG. 1 to accept information. For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portion of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numbers 1, 2, 3, and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. Instead, the consecutive positions from the right as viewed in FIG. 2, for a domain adjacent the vertical channel preparatory to a transfer operation are described. A domain in position 4 of FIG. 2 is ready to begin its transfer cycle.

Figure 3:
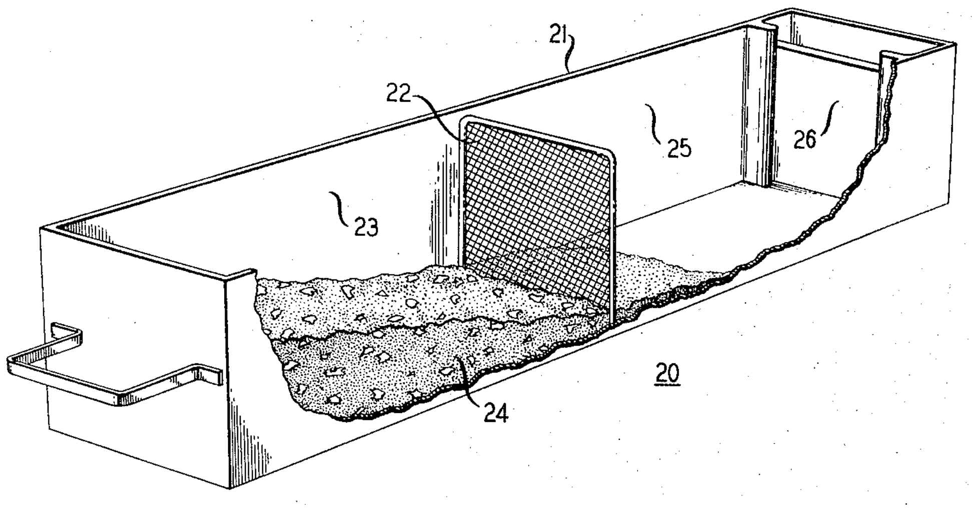
FIG. 3 is a perspective view of a type of apparatus found suitable for growth of LPE film herein.
Figure 4:
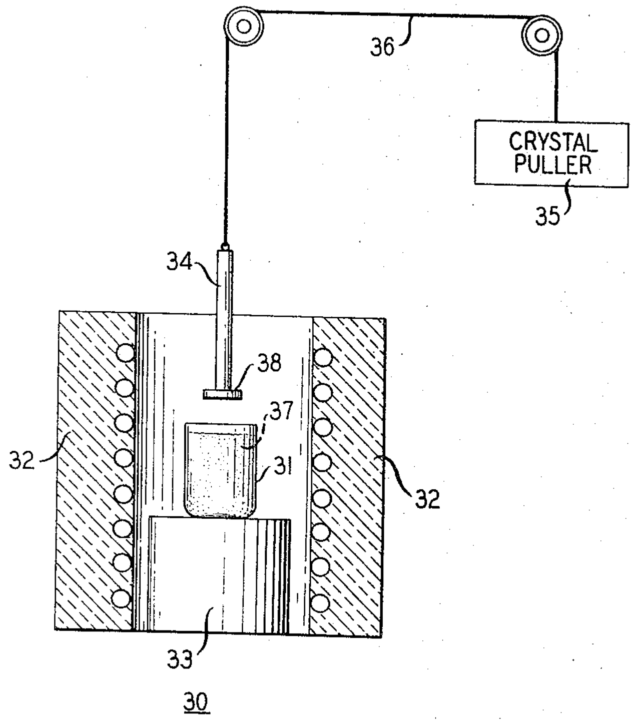
FIG. 4 is a perspective view of apparatus alternative to that of FIG. 3.

FIGS. 3 and 4 depict two types of apparatus which have been utilized in the growth of epitaxial films in accordance with the invention.

The apparatus 20 of FIG. 3 is similar to the tipping apparatus familiar in the growth of LPE layers of III-V semiconductors. It consists of an elongated vessel 21 partitioned into two sections by a screen 22. One segment 23, frequently referred to as the saturating region, is initially loaded with the growth materials 24, while segment 25, known as the growing region, contains the substrate. Not shown in the figure is either the equipment required for maintaining appropriate temperature during the soak and growth periods, or the apparatus for tipping the container 21 subsequent to the soak period and again subsequent to the growth period. As depicted, the apparatus of FIG. 3 is in the soak cycle so that the saturating region 23 is at an elevation below that of growth region 25. During this period, the flux is saturated with growth material at the temperature at which growth will take place. Following the soak, the chamber 21 is tilted in the opposite direction so that the now liquid flux passes through screen 22 and comes in contact with substrate 26.

The apparatus 30 of FIG. 4 resembles Czochralski pulling apparatus and includes a platinum crucible 31 heated by a resistance furnace 32. Crucible 31 is supported by pedestal 33 so as to position the flux in a region of low thermal gradients. The remainder of the apparatus consists of a substrate holder 34, pulling means 35, and some interconnecting means 36. The figure also shows a flux solution 37 and a garnet substrate 38.

3. Processing

Most significantly, processing conditions are designed so as to give rise to the "artificial" (111) or (100) facet which is essential to the invention. Generally, this is achieved by arranging growth conditions so as to (1) minimize substrate attack prior to growth, and (2) so as to maximize growth rate.

There are two fundamental approaches to LPE growth, and these are illustrated by FIGS. 3 and 4. In the tipping method using the apparatus of FIG. 3, growth proceeds on an immersed substrate. In the second type of procedure exemplified by the pulling technique, for example, utilizing the apparatus shown in FIG. 4, growth proceeds out of a thin layer of liquid which has wetted the substrate which is otherwise out of contact with any reservoir of nutrient material. Both of the figures are to be considered illustrative only. Growth may be carried out within a reservoir in a variation of the apparatus of FIG. 4, and growth may proceed on a withdrawn substrate within a tipping apparatus such as that of FIG. 3. Alternatively, liquid may be brushed or sprayed on a substrate, or a variety of other techniques may be utilized.

The two procedures are discussed generally:

1. Immersion Technique

This is illustrated by the tipping technique with reference to FIG. 3. In accordance with one embodiment, where growth is to proceed on an immersed substrate, it is required that the solution be saturated. This is accomplished by substantial "soaking" during which flux is maintained at an elevated temperature in the presence of excess nutrient. In a preferred embodiment utilized in Example 1, the soak was actually carried out over two distinct temperature ranges. After maintaining for a sufficient period at an elevated temperature, the solution was reduced in temperature; and, again, maintained at this temperature, to further assure saturation. Particular temperatures utilized depend on a number of considerations, e.g., flux composition, nutrient composition, desired layer thickness, etc. In general, in the instance of a usual $PbO—B_2O_3$ flux of a weight ratio of the order 50:1, a first soak at a temperature of about 1050° C for a period of about 15 to 18 hours followed by a reduced soak from 900° to 950° C for a period of about 2 to 5 hours was found to assure reproducible results. It is the nature of the tipping procedure as ordinarily practiced that the substrate is exposed to any volatilized material emanating from the flux. Due to the similarity of the substrate, to the dissolved nutrient, any suitable flux, is to some extent a solvent for the substrate material. To the extent that volatile flux ingredients come in contact with the substrate there may be surface dissolution resulting in irregularities which may be replicated in the growing film. This consideration places a maximum temperature on the soak. This maximum temperature, again, depends on the compositional nature of all the materials involved. In the instance of PbO-containing fluxes appreciable substrate attack was found to occur only at a temperature in excess of 1050° C. Where substrate attack poses a significant problem, it may be avoided by apparatus variations such as a weir which minimize or prevent contact between volatile ingredients and the substrate prior to immersion.

Following the saturate or soak period, the flux solution is brought into contact with the substrate surface (as by tipping in the apparatus of FIG. 3). With the liquid in contact, the substrate temperature is rapidly dropped. Cooling rates of the order of 250° C per hour and higher may be accomplished simply within most types of furnace designs. More rapid rates may be achieved by withdrawal of the chamber and contents or by ancillary cooling means. Cooling is continued for the period required to crystallize the requisite film thickness (generally of the order of 5 to 40 micrometer). For the system under discussion and with a cooling rate of about 250° C per hour, this is achieved in the time period of the order of from 10 to 20 minutes. Attainment of the minimum cooling rate is considered critical. Reducing the cooling rate appreciably results in a marked tendency toward faceted growth. For these purposes a minimum cooling rate of 150° C per hour is prescribed. A preferred minimum is set at about 200° C per hour.

Discussion of wetted growth and of dropping-temperature immersion growth is in terms of required cooling rates during crystallization. As indicated, a fairly rapid cooling rate of a minimum value prescribed results in a minimization of capping and, therefore, is a significant factor permitting growth of the "artificial" facets of the invention. Some of the examples are directed to a crystallographically equivalent procedure in which growth on an immersed wafer takes place out of a supersaturated solution without altering the real temperature. Such supersaturated (or supercooled) flux solutions are sufficiently supercooled such that the composition is in thermal equilibrium only at temperatures at least 10° in excess of their real temperatures. It is apparent that such growth is the complete equivalent of a dropping-temperature technique in which supersaturation (or supercooling) is brought about by reducing the temperature of a saturated (or even of a more dilute) solution. It is observed that for all growth procedures, in accordance with the invention, whether dropping-temperature or constant-temperature, growth proceeds at a rate of at least 0.2 micrometers per minute (the usual range is from 0.2 micrometer to about 5 micrometers per minute). It is apparent that from the kinetic standpoint the fact that the growth rate is in the same range indicates that the effective temperature drop is the same. To verify this, samples have been immersed in supersaturated solutions of all the substances investigated for periods of 30 seconds or less with the observation that growth occurs within such period. Since the composition of the growing interface is of necessity in substantial thermodynamic equilibrium for the operating temperature, and since the bulk of the liquid at a point removed from the growing interface is at a composition corresponding with a temperature at least 10° higher than the actual temperature, it is clear that the effective drop in temperature has occurred over a period no greater than the 30 second immersion period. This is, therefore, equivalent to a minimum of 20° per minute or 1200° per hour and is clearly within the growth conditions prescribed for the dropping-temperature techniques.

2. Wetted Growth

In this procedure, growth proceeds out of the limited liquid layer which adheres to the substrate. It may result from immersion and withdrawal of a substrate, as in the apparatus of FIG. 4, or it may result from spraying or otherwise laying down a layer of liquid. A characteristic of the process is that the relatively small liquid volume involved permits very rapid growth. The minimum prescribed cooling rate of 150° C per hour is easily achieved; and, under many circumstances, the cooling rate may be of the order of thousands of degrees per hour. Since it is no requirement that the substrate be maintained in position with a large body of liquid for an appreciable period, saturation is not a critical requirement; and, indeed, where a spraying or painting technique is used, it is no requirement at all. Since it is not required that there be a long soak period or any appreciable exposure to volatilized flux ingredients prior to growth, the entire procedure is somewhat less critical than is the immersion procedure. Where an open crucible is used, as in the apparatus of FIG. 4, it has been found preferable to utilize a low volatility flux such as $Bi_2O_3$ merely to maintain flux to nutrient ratio constant over substantial periods. Aside from this practical consideration, presence of volatile flux ingredients is not generally deleterious.

Whereas in the immersion procedure layer thickness is dependent, inter alia, on immersion time, thickness of layers grown by a wetted method is dependent on other factors. It has been observed that under normal circumstances the amount of nutrient carried with the flux and in contact with the substrate during crystallization is far in excess of that responsible for layer growth. It has been observed that ordered growth proceeds only during an initial period of crystallization. Following this initial period, solidifying material is separated from this layer by a layer of flux which is substantially depleted with respect to nutrient. This depleted layer acts as a parting layer so that excess flux (and contained nutrient) are easily removed. Under certain circumstances, the mismatch in temperature coefficient of expansion is sufficient so that the excess material is physically separated.

Control of layer thickness is afforded by two parameters. The first is flux-to-nutrient ratio and the second is the temperature of the flux system during initial wetting. Increasing the flux-to-nutrient ratio results in a reduction of film thickness while increasing the temperature of the wetting liquid results in an increase in film thickness. Using a $Bi_2O_3$ flux, it has been found that layer thicknesses of from 5 to 40 micrometers are regularly obtained with a flux-to-nutrient weight ratio of 4:1. For this particular system, a useful temperature range for the initial wetting liquid is of the order of from 950° C to 1100° C.

4. Examples

Example 1

A layer of $Er_2Eu_1Fe_{4.3}Ga_{.7}O_{12}$ of a thickness of approximately 10 micrometers was grown on a substrate of $Gd_3Ga_5O_{12}$ of an area of approximately 1 square centimeter using the tipping technique in a vessel as depicted in FIG. 3. The saturating region was first loaded with a powdered mixture consisting of:

0.36 grams $Eu_2O_3$
1.356 grams $Er_2O_3$
3.00 grams $Fe_2O_3$
0.29 grams $Ga_2O_3$
60.0 grams PbO
1.2 grams $B_2O_3$ (this represents an iron-rich starting mixture consistent with the practice generally followed in the growth of bulk crystals). After placing the substrate in its holder in the growth region, the vessel was tilted with the saturating region at an elevation below that of the growth region and temperature was raised to 1050° C at which it was maintained for a period of 18 hours. The flux-to-nutrient ratio was such that an excess of all of the garnet forming ingredients was maintained in undissolved form. Following this initial soak, temperature was dropped and maintained at 920° C at which it was held for a period of 4½ hours. The vessel was then tilted in the opposite direction so as to cause the liquid flux and dissolved nutrient to pass through the screen and come into contact with the substrate. Substrate and liquid were equilibrated for a period of about 30 seconds, following which cooling was commenced by turning off the furnace power. The cooling rate was estimated to be about 300° C per hour (equilibration, while considered desirable, has not been found necessary for the growth of films with device properties). Cooling was continued until the temperature of about 850° C was obtained (about 14 minutes). Upon attainment of the temperature of 850° C, the vessel was tilted to its original position so as to drain the residual flux and dissolved nutrient from the growth region. Substrate and grown layer were removed from the boat and permitted to cool to room temperature. The assembly was washed in warm nitric acid solution to remove residual flux. The formed layer was of a thickness of about 8 micrometers, and the composition had a magnetization of approximately 100 gauss, which approximately corresponds to the calculated remanent magnetization for the noted composition.

The sample was fabricated into a T-bar circuit device of the general design depicted in FIGS. 1 and 2 and was operated as a shift register with bubble propagation over a hundred bit positions. Bubble size, a fraction of a mil in diameter, was sufficiently small to permit $10^6$ bits per inch square of film.

Example 2

In this example, an eight micrometer layer of $Gd_{2.34}Tb_{.66}Fe_5O_{12}$ was grown on a substrate of $Nd_3Ga_5O_{12}$ by a wetted procedure utilizing a pulling apparatus such as depicted in FIG. 4. A melt was first prepared from a 4:1 weight ratio of flux to nutrient. The nutrient of approximately 20 grams was made up of a stoichiometric mixture of oxidic powders of gadolinium, terbium, and iron. The flux was unmodified $Bi_2O_3$.

The entire mixture was liquified by heating to a temperature of approximately 1010°C, the substrate was slowly inserted into the heated portion of the furnace, and was then immersed into the flux-nutrient solution from which it was immediately withdrawn (residence time was of the order of a few seconds). The wetted substrate was withdrawn from the furnace at such rate as to result in a reduction of temperature to about 800° C in a period of about 5 minutes. At this temperature, the wetted layer had solidified. Subsequent cooling to room temperature was carried out over a period of about 4 to 5 minutes. The upper portion of the now solidified wetting mass was mechanically parted from the adherent layer of the noted garnet composition. The magnetic moment of the layer at room temperature was approximately 250 gauss, approximately corresponding with the remanent magnetization for bulk samples of the noted composition (a slight increase in magnetization sometimes noted was attributed to neodymium incorporation from the substrate).

After rinsing in nitric acid, a shift register of the type described in Example 1 was fabricated. Stable bubble size was approximately 2 micrometers.

Example 3

The procedure of Example 2 was followed in the preparation of a film of $Gd_{2.85}Nd_{.15}Fe_5O_{12}$ on the same substrate composition. Wetting temperature was approximately 990° C. Other conditions were as generally noted in Example 2. Again, a device of the nature described in Example 1 was fabricated and operated. $4\pi M_s$ was equal to about 300 gauss. A small increase as compared with the bulk material was attributed to neodymium inclusion.

Example 4

Using a wetting technique, a layer of $Y_1Gd_2Al_{.35}Fe_{.65}O_{12}$ was grown in a substrate of $Gd_3Ga_5O_{12}$. Consistent with bulk growth of this composition, the nutrient included an iron excess of approximately 20 weight percent based on the stoichiometric amount of iron. Initial wetting temperature was 1090° C. Other processing conditions were as noted in the preceding example. Remanent magnetization was approximately 100 gauss which corresponds approximately with that of the bulk material (a minor decrease in $4\pi M_s$ was attributed to gadolinium inclusion from the substrate).

All of the above examples were conducted with a (111) orientation. All grown films were epitaxial, single crystalline, smooth, and of uniform thickness. All remanent magnetization values were measured normal to the plane of the formed film.

The following examples relate to the type of immersion procedure in which growth proceeds by virtue of supersaturation of the flux solution. As discussed above, a driving force that yields the growth rate necessary for every embodiment of the invention results from the compositional difference between the bulk of the liquid, which is supersaturated, and the equilibrium interface, at which growth proceeds.

Example 5

A layer of $Er_2Eu_1Fe_{4.3}Ga_{.70}O_{12}$ of a thickness of approximately 10 micrometers was grown on a substrate of $Gd_3Ga_5O_{12}$ of an area of approximately 1 square centimeter in a vessel as depicted in FIG. 4. The flux solution was produced from a powdered mixture consisting of 0.36 grams $Eu_2O_3$
1.356 grams $Er_2O_3$
3.00 grams $Fe_2O_3$
0.29 grams $Ga_2O_3$
60.0 grams PbO
1.2 grams $B_2O_3$ (In common with other procedures in which lead oxide containing fluxes are used, this composition represents a degree of iron enrichment. As is well known, iron enrichment is necessary to produce garnet growth.)

The entire mixture was liquefied by heating to a temperature of approximately 1000° C. Container and contents were maintained at a temperature for a period necessary to maintain complete solution (in some examples from of the order of 2 hours up). After complete solution was attained, crucible and contents were cooled to 880° C (cooling rate, while not critical, was of the order of 100° C per hour). Since the initial composition is substantially saturated at a temperature of about 960° C, the temperature of 880° C represents a supercooling of about 80° C.

The substrate was brought to a temperature approximately that of the liquid by maintaining it suspended above the furnace over a period of at least 5 minutes. The sample was then immersed within the flux solution and was kept immersed for a period of about 5 minutes after which it was withdrawn. Neither immersion or extraction rates were critical except from the standpoint of maintaining uniform thickness since growth proceeds primarily on the portion of the substrate which is immersed. In this example, total immersion took about 5 seconds. The extraction rate was similar.

It was observed that the substrate together with its epitaxial film included no perceptible wetted liquid material upon being withdrawn. As discussed above, this condition, considered preferred from the inventive standpoint, contributes to uniform film growth. Subsequent cooling to room temperature was permitted to occur over an interval of about 2 minutes. Since there was little or no adherent liquid material wetting the withdrawn substrate and film, there was no need for acid washing or any other procedure for preparing the film prior to testing.

Magnetically, the film of this example showed the properties of that of Example 1. A moving magnetic field was applied across the sample to determine its magnetic uniformity. It was determined that pinning centers having a coercivity of 2 oersteds or higher numbered less than 10 over the square centimeter sample.

As in Example 1, the sample was fabricated into a circuit device depicted in FIGS. 1 and 2. It was operated as a shift register, with bubble propagation over 10 thousand bit positions. Bubble size, a fraction of a mil in diameter, was as in all of the examples therein sufficiently small to permit a packing density of $10^6$ bits per square inch of film.

Example 6

The procedure of Example 5 was carried out using the same ingredients and other processing parameters with the exception that temperature of the crucible and contents was increased from 880° C to 910° C during the minute period of immersion. Results were essentially equivalent although some decrease in thickness of the film grown resulted.

Example 7

The procedure of Example 5 was again repeated with identical processing parameters and compositions except that immersion temperature, initially at 940° C representing a supercooling rate of approximately 120° C, was dropped to a final temperature of 880° C, again during the 5 minute immersion period. Again, results were essentially equivalent except that some thinning of the film was apparent.

Example 8

The procedure of Example 5 was utilized to grow a layer of $Er_{1.5}Eu_{1.5}Fe_{4.6}Al_{.40}O_{12}$, again, of a thickness of approximately 10 micrometers on a substrate of the same composition on a 2 square centimeter substrate of the same composition ($Gd_3Ga_5O_{12}$). The initial ingredients were:

$Eu_2O_3$ 2.22 grams
$Er_2O_3$ 2.35 grams
$Fe_2O_3$ 5.64 grams
$Al_2O_3$ 0.32 grams
PbO 82.7 grams
$B_2O_3$ 2.17 grams The solution was formed at an initial temperature of about 1000° C and was then cooled to a temperature of about 940° C (representing a supercooling of approximately 30°C). The seed was kept immersed for a period of about 10 minutes. In general, the magnetic and physical properties of the film evidenced the same uniformity and perfection of the film produced in Example 5.

Example 9

The procedure of Example 5 was utilized to grow a layer of the approximate composition $Er_2Gd_1Fe_{4.75}Ga_{.25}O_{12}$ of a thickness of approximately 10 micrometers. The substrate again was $Gd_3Ga_5O_{12}$ having an area of approximately 2 square centimeters. Starting ingredients were:

4.58 grams $Er_2O_3$
2.17 grams $Gd_2O_3$
20.0 grams $Fe_2O_3$
1.1 grams $Ga_2O_3$
170.0 grams PbO
3.8 grams $B_2O_3$ The solution was formed at an initial temperature of about 1000° C, was dropped to a temperature of approximately 910° C (supercooling to about 50°C). Immersion time was of the order of 10 minutes.

The final product manifested the general characteristics as described for the product of Example 5.

Example 10

Example 9 was repeated, however, with addition of 0.1 gram $CaCO_3$ to the initial ingredients. The final product, otherwise virtually indistinguishable from that of Example 9, showed a mobility of approximately 350 centimeters per second per oersted (representing some improvement over the products of the previous examples).

Example 11

The procedure of Example 5 was again utilized this time to grow a layer of $Er_{1.9}Gd_{1.1}Fe_{1.5}Al_{.5}O_{12}$. The substrate $Sm_{2.25}Gd_{.75}Ga_2O_{12}$ of an area of approximately 1 square centimeter was as in the above examples of (111) orientation. Initial ingredients were:

$Eu_2O_3$ 3.34 grams
$Gd_2O_3$ 1.99 grams
$Fe_2O_3$ 18.0 grams
$Al_2O_3$ 0.50 grams
PbO 200 grams
$B_2O_3$ 5 grams Initial solution was carried out at approximately 1000° C; the temperature was then dropped to 810° C (representing a supercooling of approximately 90°C), and immersion was maintained for about 10 minutes. The resulting film had a thickness of about 5 micrometers and showed the general properties described in conjunction with the product of Example 5.

Example 12

The procedure of Example 11 was repeated, however, utilizing a substrate of the approximate composition $Sm_{2.55}Gd_{0.45}Ga_5O_{12}$. Starting ingredients and processing parameters were the same. The resulting film was esentially identical to that of Example 11.

Example 13

The procedure of Example 11 was again repeated, this time utilizing a substrate composition of $Sm_3Ga_5O_{12}$ and utilizing the same starting ingredients and operating parameters. The resulting film was essentially identical to that of Examples 11 and 12.

Example 14

The procedure of Example 12 was repeated however using a substrate having a (100) orientation. The same immersion time and temperature resulted in a film of the same composition and the same approximate thickness, the film, however, evidencing a (100) orientation. Film properties of interest from a device standpoint were similar to those of the films produced in the preceding three examples.

Example 15

The procedure of Example 2 was utilized to grow a layer of the approximate composition $Ca_{1.8}Bi_{1.2}V_{.9}Fe_{4.1}O_{12}$. Substrate composition was approximately $Nd_3Ga_5O_{12}$. The flux was made up of $Bi_2O_3$ and $V_2O_5$. Initial ingredients were:

18 grams $CaCO_3$
55.9 grams $Bi_2O_3$
7.15 grams $V_2O_5$
23.5 grams $Fe_2O_3$

As in Example 2, liquefaction occurred by heating to approximately 1010° C. The substrate was slowly inserted into the nutrient-flux solution and was withdrawn after a residence time of a few seconds. The now wetted substrate underwent a temperature change to room temperature at a rate of about 800° C in a period of about 5 minutes. The solidified layer was of a thickness of approximately 5 micrometers (after removal of the flux rich outer layer). Magnetic properties approximate those of bulk samples of the same composition.

Example 16

The procedure of Example 11 was followed. A layer of $Y_{1.03}Gd_{1.29}Yb_{0.68}Fe_{4.3}Al_{0.7}O_{12}$ of approximately 6 micrometers in thickness was grown in a period of 10 minutes on a substrate of $Gd_3Ga_5O_{12}$. The flux solution was produced from a powdered mixture of 10.8 grams $Fe_2O_3$
0.358 grams $Y_2O_3$
0.720 grams $Gd_2O_3$
0.418 grams $Yb_2O_3$
0.300 grams $Al_2O_3$
135.0 grams PbO
3.38 grams $B_2O_3$ Temperature was maintained at 920 C during growth (20° C supercooling).

Example 17

The procedure of Example 11 was followed. A layer of composition $Y_{1.08}Gd_{1.23}Yb_{0.65}La_{0.04}Fe_{4.3}Al_{0.7}O_{12}$ was grown in a period of 10 minutes to a thickness of approximately 6 micrometers on a substrate of $Gd_3Ga_5O_{12}$. The flux solution was produced from a powdered mixture consisting of:

0.621 grams $Y_2O_3$
1.15 grams $Gd_2O_3$
0.459 grams $Yb_2O_3$
0.407 grams $La_2O_3$
15.78 grams $Fe_2O_3$
0.55 grams $Al_2O_3$
228.0 grams PbO
5.7 grams $Al_2O_3$ Temperature was maintained at 920° C during growth (20° C supercooling).

It has been noted that agitation, which may take a variety of forms including rotation, may be usefully employed as in other growth procedures. The effect of agitation, as is well known, is to produce some improvement in compositional uniformity, in growth rate uniformity, and sometimes to produce an increase in growth rate. This latter effect is sometimes ascribed to a decrease in the diffusion limited (δ) layer. In Examples 18 and 19, layers of approximately 5 micrometers were grown in a period of approximately 5 minutes. The degree of supercooling was about 18°C. Whereas experiment has shown that under non-agitating conditions such total growth takes about 10 minutes to achieve, the growth rate was approximately doubled by agitation.

Example 18

The procedure of Example 11 was followed. A layer of $Gd_{1.286}Y_{1.026}Yb_{0.688}Al_{0.757}Sc\mathbf{0.202}Ga_{0.322}Fe_{3.718}O_{12}$ was grown in a period of 5.5 minutes to a thickness of approximately 5 micrometers on a substrate of $Gd_3Ga_5O_{12}$. The flux solution was produced from a powdered mixture consisting of:

0.7037 grams $Yb_2O_3$
0.6007 grams $Y_2O_3$
1.2086 grams $Gd_2O_3$
0.5046 grams $Al_2O_3$
18.1247 grams $Fe_2O_3$
0.0711 grams $Sc_2O_3$
0.4681 grams $Ga_2O_3$
226.5 grams PbO
5.7 grams $B_2O_3$ Temperature was maintained at 940° C during growth (15° supercooling). Agitation was accomplished by rotating the substrate about its own axis at a rate of about 200 r.p.m. Such rotation was continued for a period of about 5 seconds and repeated at 30-second intervals with the sense of the rotation being reversed after each interval.

Example 19

The procedure of Example 18 was followed. A layer of $TmGdYFe_{4.37}Ga_{0.63}O_{12}$ was grown in a period of 5.5 minutes to a thickness of approximately 5 micrometers on a substrate of $Gd_3Ga_5O_{12}$. The flux solution was produced from a powdered mixture consisting of:

0.938 grams $Tm_2O_3$
0.882 grams $Gd_2O_3$
0.550 grams $Y_2O_3$
13.357 grams $Fe_2O_3$
0.878 grams $Ga_2O_3$
213.6 grams PbO
4.26 grams $B_2O_3$ Temperature was maintained at 940° C during growth (20° C supercooling).

Examples 20 – 23

The procedure of Example 18 was utilized to grow the indicated final composition on a substrate of $Gd_3Ga_5O_{12}$. In each of these instances, growth proceeded at a temperature of about 930° C representing a supercooling of approximately 15° C. In each instance, the epitaxial layer was of a thickness of approximately 8 micrometers covering a substrate having an area of at least 1 square centimeter with immersion time being about 10 minutes.

Example 20

Grown Composition
$Y_{1.03}Gd_{1.29}Yb_{.68}Al_{.7}Fe_{4.3}O_{12}$
Starting Ingredients
0.358 grams $Y_2O_3$
0.720 grams $Gd_2O_3$
0.418 grams $Yb_2O_3$
0.300 grams $Al_2O_3$
10.80 grams $Fe_2O_3$
135.0 grams PbO
3.42 grams $B_2O_3$ Example 21

Grown Composition
$Y_{1.75}Gd_1Eu_{.25}Al_{.6}Fe_{4.4}O_{12}$
Starting Ingredients
0.990 grams $Y_2O_3$
0.905 grams $Gd_2O_3$
0.22 grams $Eu_2O_3$
0.30 grams $Al_2O_3$
13.02 grams $Fe_2O_3$
180.5 grams PbO
4.5 grams $B_2O_3$ Example 22

Grown Composition
$Y_{.94}Gd_{1.07}Yb_{.57}La_{.42}Al.7Fe_{4.3}O_{12}$
Starting Ingredients
0.62095 grams $Y_2O_3$
1.146 grams $Gd_2O_3$
0.659 grams $Yb_2O_3$
0.407 grams $La_2O_3$
0.405 grams $Al_2O_3$
20.1 grams $Fe_2O_3$
240.0 grams PbO
6.0 grams $B_2O_3$ Example 23

Grown Composition
$Y_{.87}Gd_{1.24}Tm_{.89}Al_{.7}Fe_{4.3}O_{12}$
Starting Ingredients
0.565 grams $Y_2O_3$
1.295 grams $Gd_2O_3$
0.857 grams $Tm_2O_3$
0.4 grams $Al_2O_3$
13.9 grams $Fe_2O_3$
787.5 grams PbO
4.6 grams $B_2O_3$

What is claimed is:

1. Method for the heteroepitaxial growth of a first composition of the garnet structure on a thermodynamically unstable crystallographic surface of a second composition of the garnet structure comprising growing the first composition by crystallization from a nutrient-flux solution in which the first and second said composition have lattice parameters, $a_o$, differing by a maximum of about 0.5 percent at a temperature, characterized in that such growth proceeds at a rate of at least 0.2 $\mu$m per minute, in that such growth results in a smooth layer of the said first composition, in that the said first composition contains at least two cations in the crystallographic dodecahedral site so that the said layer evidences a magnetically easy direction which is primarily growth induced, the said magnetically easy direction lying in the crystallographic direction normal to the plane of the said layer, the said layer evidencing the crystallographic orientation of the said second composition.

2. Method of claim 1 in which the said crystallographic surface of the said second composition is of (111) orientation.

3. Method of claim 1 in which the said at least two cations are rare earth ions, in which the said growth at a rate of at least 0.2 micrometer per minute is due to an effective decrease in temperature at a rate of at least 150° C per hour.

4. Method of claim 3 in which the actual temperature is decreased at at least the said rate at the said growing layer.

5. Method of claim 3 in which growth results due to a compositional gradient between a supersaturated nutrient-flux solution and a growing interface, said gradient corresponding thermodynamically to a temperature decrease of at least 150° C per hour.

6. Method of claim 1 in which growth proceeds on a substrate immersed in a massive body of a liquid consisting essentially of the said nutrient-flux solution and in which the cooling rate during crystallization proceeds from a maximum temperature of no greater than 1050° C at a rate of at least 150° C per hour.

7. Method of claim 6 in which the said flux contains PbO.

8. Method of claim 7 in which the said flux consists essentially of a PbO-$B_2O_3$ mixture.

9. Method of claim 1 in which growth proceeds on a substrate immersed in a massive body of a liquid consisting essentially of the said nutrient-flux solution in which the said nutrient-flux solution is supersaturated to such degree that its average composition is thermodynamically stable only at a temperature at least 10° above its real temperature.

10. Method of claim 1 in which the said nutrient-flux solution is essentially saturated with respect to nutrient.

11. Method of claim 1 in which crystallization proceeds from a portion of nutrient-flux solution which is retained in contact with the said substrate essentially by wetting.

12. Method of claim 11 in which the wetting portion results from substrate immersion in and withdrawal from a massive body of the said solution.

13. Method of claim 12 in which the said flux consists essentially of $Bi_2O_3$.

14. Method of claim 1 in which exposure of the substrate to volatile flux ingredients is minimized prior to contacting the said substrate with the said solution.

15. Method of claim 14 in which the flux contains lead oxide and in which the nutrient-flux solution is prevented from rising to a temperature above 1050° C while the substrate is in a position to be attacked by volatile flux ingredients.

16. Method of claim 1 in which the dodecahedral sites of the said layer are occupied by at least two different ions, the larger of which has a negative magnetostrictive sign in a crystallographic [111] direction and the smaller of which has a positive magnetostrictive spin in a crystallographic [111] direction.

17. Product produced in accordance with the method of claim 1.

* * * * *

UNITED STATES PATENT OFFICE
CERTIFICATE OF CORRECTION

Patent No. 3,837,911 Dated September 24, 1974

Inventor(s) Andrew H. Bobeck, Hyman J. Levinstein and Larry K. Shick

It is certified that error appears in the above-identified patent and that said Letters Patent are hereby corrected as shown below:

Column 9, line 14, "basic" first occurrence should be --basis--.
Column 11, line 63, "numbers" should be --numerals--.
Column 13, line 52, "micrometer" should be --micrometers--.
Column 17, line 13, "$Er_2Eu_1Fe_{4.3}Ga_{.7012}$" should read --$Er_2Eu_1Fe_{4.3}Ga_{.7}O_{12}$--.

Column 18, line 15, after "the" insert --5--.
Column 19, line 32, change "esentially" to --essentially--.
Column 20, line 14, after "920" insert --degrees--.
Column 20, line 51, change "$Gd_{1.286}Y_{1.026}Yb_{0.688}Al_{0.757}Sc0.202Ga_{0.322}Fe_{3.718}O_{12}$" to --$Gd_{1.286}Y_{1.026}Yb_{0.688}Al_{0.757}Sc_{0.202}Ga_{0.322}Fe_{3.718}O_{12}$--.

Column 21, line 52, change "$Y_{.94}Gd_{1.07}Yb_{.57}La_{.42}Al.7Fe_{4.3}O_{12}$"

to --$Y_{.94}Gd_{1.07}Yb_{.57}La_{.42}Al_{.7}Fe_{4.3}O_{12}$--.

Signed and sealed this 31st day of December 1974.

(SEAL)
Attest:

McCOY M. GIBSON JR.
Attesting Officer

C. MARSHALL DANN
Commissioner of Patents